«12» United States Patent
Gierer et al.

(10) Patent No.: US 6,527,670 B1
(45) Date of Patent: Mar. 4, 2003

(54) CONTROL DEVICE FOR AN AUTOMATIC AUTOMOBILE TRANSMISSION

(75) Inventors: Georg Gierer, Kressbronn (DE); Uwe Rühringer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/831,560

(22) PCT Filed: Dec. 13, 1999

(86) PCT No.: PCT/EP99/09852

§ 371 (c)(1),
(2), (4) Date: May 10, 2001

(87) PCT Pub. No.: WO00/37836

PCT Pub. Date: Jun. 29, 2000

(30) Foreign Application Priority Data

Dec. 18, 1998 (DE) .......................... 198 58 543

(51) Int. Cl.[7] .......................... F16H 61/22; F16H 61/12
(52) U.S. Cl. .......................... 477/94; 477/906; 192/220
(58) Field of Search ................. 192/218, 220, 192/221; 477/92, 94, 95, 906; 475/119, 140

(56) References Cited

U.S. PATENT DOCUMENTS

| 3,972,398 A | * | 8/1976 | Chamberlain | 192/220 |
| 3,978,946 A | * | 9/1976 | Ream | 192/220 |
| 4,227,598 A | * | 10/1980 | Luft | 192/220.1 |
| 4,273,224 A | * | 6/1981 | Brown et al. | 477/95 |
| 4,530,427 A | * | 7/1985 | Skeel | 192/220 |
| 5,337,625 A | | 8/1994 | Jang | 74/335 |

FOREIGN PATENT DOCUMENTS

| DE | 36 13 800 A1 | 10/1987 |
| DE | 43 17 257 C1 | 5/1994 |
| DE | 43 22 523 A1 | 1/1995 |
| GB | 2 293 219 A | 3/1996 |

* cited by examiner

Primary Examiner—Ankur Parekh
(74) Attorney, Agent, or Firm—Davis & Bujold, P.L.L.C.

(57) ABSTRACT

An electronic-hydraulic control device of an automatic automobile transmission with frictional clutches or brakes that can be hydraulically operated to shift individual gears (A, B C, D, E), and with an electronic control device (32) which is electrically connected with a lever inside the motor vehicle, shifting gears depending on the preselected lever position and certain parameters of the combustion engine and transmission. If the electronic control device (32) thus de-energizing all solenoid valves (11, 12, 15, 16), an emergency gear is maintained during forward travel until the combustion engine is shut off after which the parking mechanism is automatically engaged, and if the electronic transmission control (32) fails during rearward travel, all clutches or brakes are depressurized and the parking mechanism is automatically engaged. By manually operating a lever (36), a valve (17) is actuated which automatically engages an emergency gear for forward travel and simultaneously unlocks the parking mechanism, with the parking mechanism and forward gear being maintained until the combustion engine is shut off.

7 Claims, 2 Drawing Sheets

Table 1

Table 2

CONTROL DEVICE FOR AN AUTOMATIC AUTOMOBILE TRANSMISSION

FIELD OF THE INVENTION

The invention relates to an electro-hydraulic control device for an automatic automobile transmission.

BACKGROUND OF THE INVENTION

It is possible to preselect various operating stages such as forward travel, rearward travel, neutral, or parking position from an operating device in the automobile. In automatic transmissions, depending on the operating modes selected, clutches and brakes are operated through a hydraulic control. Generally, the effective connection from the operating element inside the vehicle to the electro-hydraulic control device in the automatic transmission is implemented mechanically, e.g., by Bowden cables. However, it is also possible to implement the effective connection between the operating element and the transmission control purely electrically. This has the advantage of being able to select the location of the operating element freely inside the vehicle. As in case of an electric effective connection, the parking mechanism cannot be released or engaged mechanically using the Bowden cable, the parking mechanism must be engaged via a spring storage device and released hydraulically. DE 43 22 523 A1 describes an electro-hydraulic control device of an automatic automobile transmission in which the effective connection between the operating device inside the motor vehicle and the electro-hydraulic control device can be electrical and the electro-hydraulic control device is designed such that the operating stages D, R, and N are selected by pressurizing individual shifting elements while stage P is selected by depressurizing all switching elements.

This means that not only in operating stage P, but also in all the operating stages of the selector lever the parking mechanism is engaged when the pressure fails. In order to be able to unlock the engaged parking mechanism if the electrical voltage supply fails or if there is a defect in the electronic control device, an emergency unlocking device is disclosed by means of which the parking mechanism can be unlocked mechanically.

In an automatic transmission it is necessary to be able to move the vehicle when the electronic control device fails, at least at one engaged gear, with the parking mechanism released, by the driving force of the engine. With a mechanically effective connection between the operating element in the passenger compartment and the automatic transmission, this emergency travel program, as well as the unlocking of the parking mechanism, are effected by mechanical switching of a hydraulic valve in the electro-hydraulic control of the automatic transmission. With an electrically effective connection between the operating element in the passenger compartment and the automatic transmission, there is no possibility of engaging the emergency travel program and unlocking the parking mechanism from the operating element.

SUMMARY OF THE INVENTION

The goal of the invention is to provide a control for an automatic automobile transmission in which the operating stages D, R, and N as well as P can be preselected by an operating device inside the passenger compartment and an electrical connection between the operating device and the automatic transmission, with the parking mechanism being engaged by a spring storage device and released hydraulically, and in which the parking mechanism can be released manually if the electronic transmission control fails so that the transmission is automatically switched to an emergency travel program in order to be able to operate the vehicle in a previously selected gear.

In addition, it must be possible to operate the vehicle further during forward travel until the combustion engine stops and to automatically engage the parking mechanism during rearward travel if the electronic transmission control fails.

According to the invention, this goal is achieved by a type-compliant transmission control that also includes the features of the main claim.

According to the invention, the electronic-hydraulic control device of an automatic automobile transmission is designed such that operating stages D, R, and N are selected by pressurizing individual switching elements while operating stage P is selected by depressurizing all shifting elements. As a result, the parking mechanism is engaged in operating stage P and in all the other operating stages of the selector lever if the pressure fails. The hydraulic control unit is designed such that the various gears are selected by the electronic control device energizing solenoid valves thereby switching control valves that in turn control the actuators for friction clutches or brakes. If the electronic control device fails, the solenoids are de-energized, and, in reverse gear, the control valves are controlled so that the actuators of the friction clutches or brakes as well as the parking mechanism have zero pressure. This has the advantage that if the electronic control device fails, the force connection between the drive motor and the output shaft of the transmission is interrupted and the parking mechanism is activated at the same time. By manually displacing the parking mechanism by a lever outside the transmission, the parking mechanism can be released in an emergency while simultaneously a valve is switched so that the pressure produced by a pump activates control valves to pressurize actuators so that a forward gear is engaged. Therefore, when the vehicle has stopped parking mechanism, a forward travel direction can be selected automatically by emergency-unlocking the parking mechanism so that the vehicle can start again.

When the parking mechanism has been emergency-unlocked, it remains unlocked and the preselected gear remains selected parking mechanism until the parking, mechanism is locked again manually. If the vehicle is moving rearwards when the electronic control device fails, the actuators for the friction clutches or brakes are depressurized by de-energizing all solenoid valves, and the adhesion between the drive motor and the output shaft of the transmission is interrupted. At the same time, the-valve controlling the clutch for the reverse gear is activated in such a way that when the parking mechanism is emergency-unlocked, the forward gear can be selected again.

The valves are preferably controlled such that when the valves are de-energized due to a failure of the electronic control device during forward travel, an emergency gear is selected automatically and the parking mechanism remains disengaged until the combustion engine is switched off, and, if the electronic control system fails during rearward travel, all clutches and brakes are opened so that the reverse gear is disengaged and the parking mechanism is engaged automatically.

BRIEF DESCRIPTION OF THE DRAWING(S)

Additional features important to the invention can be found in the description of the figures.

DETAILED DESCRIPTION OF THE INVENTION

Figure 1:
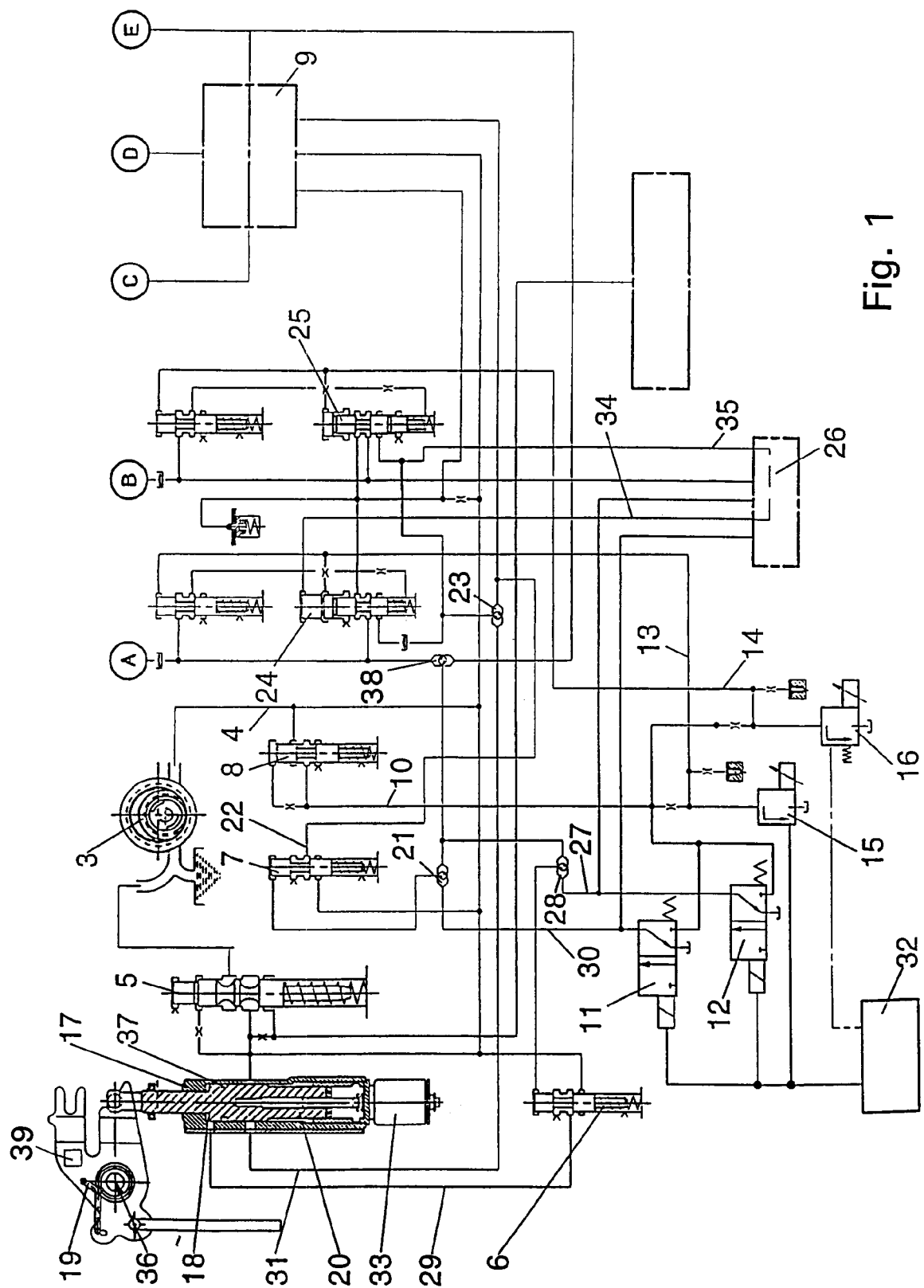
FIG. 1 shows an electro-hydraulic control of an automatic transmission in which the clutches or brakes A, B, C, D, E can be pressurized so that gears as in automatic transmissions can be selected.
Figure 1A:
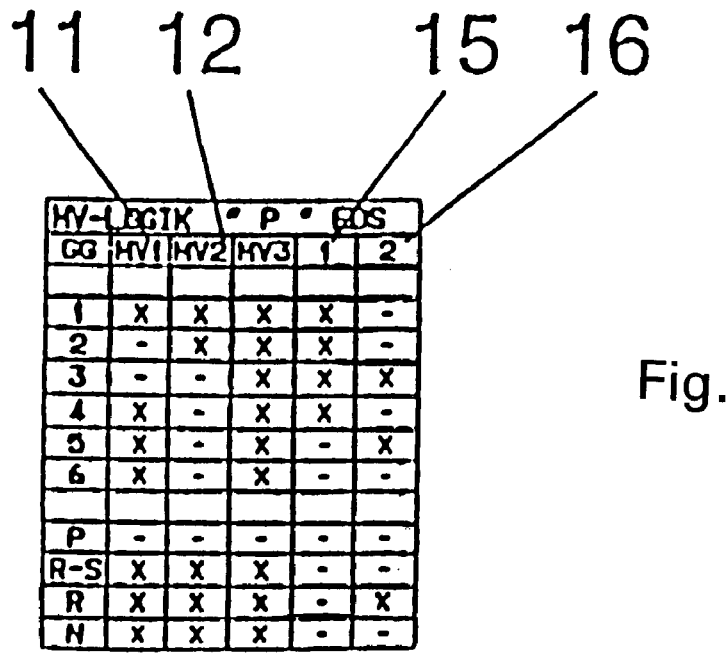
FIG. 1(a) is Table 1 Solenoid Valve Logic indicates which solenoid valve must be activated in order to engage certain gears.
Figure 1B:
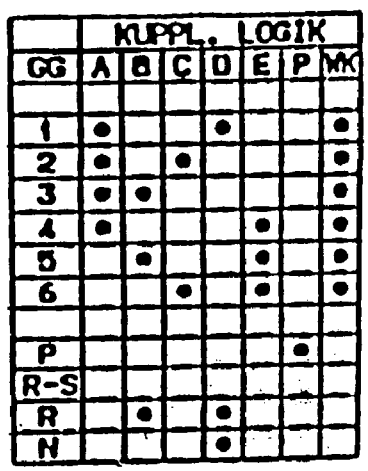
FIG. 1(b) is Table 2 Clutch Logic shows which brakes or clutches must be pressurized in order to engage certain gears.

Nos. 1 to 6 represent the gears engaged, the letter P indicates thee parking position, i.e. blocking of the automatic transmission, for example, by a parking latch engaging a parking wheel, R indicates reverse gear and N the neutral position in which the parking mechanism must be unlocked while the brakes and clutches may not be pressurized.

When the automobile engine is started, a connected pump 3 is driven delivering a volume of fluid into line 4. Line 4 is connected with system pressure valve 5, which ensures that a certain pressure level remains in the system while the combustion engine is running. Likewise, line 4 is connected with valve 6, reversing valve 7, pressure reduction valve 8 and a switching logic 9 (not further specified) by which the brakes or clutches C, D, E can be pressurized. Through pressure reduction valve 8, line 10 and therefore solenoid valves 11 arid 12 are pressurized. Line 13 has zero pressure because electrical pressure control valve 15 is designed so that line 13 is connected with the pressure-less tank. Since surface 18 of valve 17 has no pressure, spring 19 moves plunger 20 against its upper stop and moves a parking latch (not shown) connected with plunger 20, into a parking wheel (not shown), which is locked by the engagement of the parking latch in this position, therefore blocking the output of the automatic transmission. This shift position corresponds to position P in which the clutches or brakes A, B, C, D, E are pressureless.

If the selector lever is moved from this position to position N, solenoid valve 11 is energized and line 10 is connected with line 30. Valve 21 is switched so that reversing valve 7 connects line 4 with line 22 and switches valve 23 so that pressure is applied to clutch valves 24 and 25 as well as to emergency travel valve 26. Solenoid valve 12 is energized and connects line 10 with line 27 so that valve 28 is switched such that valve 6connects line 4 with line 29. As a result, pressure fluid reaches surface 18, moving by the corresponding pressure plunger 20 of valve 17 against its lower stop and pulling the parking latch out of the parking wheel releasing the blockage in the automatic transmission.

At the same time, valve 17 connects line 4 with line 31 so that there is pressure on both sides of valve 23. When the parking latch is disengaged, a position switch (not shown) of the electronic transmission control 32 reports this position, and the transmission control 32 energizes a solenoid 33 which blocks plunger 20 of valve 17 by latching in this position. This ensures that in case of a sudden pressure drop during travel, but while there is electrical voltage at solenoid 33, the parking mechanism will not suddenly engage, causing undesired blockage of the vehicle.

If third gear is selected from position P, first the solenoid valve 11 is energized so that valves 24 and 25 are pressurized via line 13, valve 21, reversing valve 7, and valve 23. Now electrical pressure control valve 15 is energized, so pressure builds up in line 13, which activates valve 24 such that clutch A is pressurized and closes. At the same time, valve 38 is activated such that pressure is applied on both sides of valve 21 so that solenoid valve 11 can be switched off again. Valve 28 is activated such that pressure fluid reaches valve 17 through valve 6 thereby unlocking the parking mechanism. Now electrical pressure control valve 16 is activated and valve 25 is activated by line 14 such that clutch B is pressurized and closes.

The automatic transmission control shifts to the various speeds during automatic operation depending on the load requirements, with the solenoid valves being driven by solenoid valve logic 1.

If during travel the solenoid valves are suddenly, de-energized due to a failure of the electronic transmission control 32, it must be possible to continue forward travel in at least one emergency gear until the combustion engine is switched off. If this condition occurs, for example, at the third speed previously described, the electrical pressure control valves 15 and 16 are de-energized and line 13 has zero pressure. As pressure control valve 16 closes when de-energized, line 14 is pressurized. Lines 34 and 35 are connected with each other by emergency travel valve 26, and valve 24 remains in its position so that clutch A remains pressurized. Clutch B remains pressurized. The parking mechanism remains disengaged until the combustion engine comes to a stop because valve 17 remains pressurized.

If the electronic transmission control 32 fails while the reverse gear is selected, the reverse gear must be disengaged by depressurizing all clutches and brakes, and the parking mechanism must be engaged. When reverse gear is engaged, valves 24 and 25 are pressurized by solenoid valve 11 through valve 21 reverse valve 7, and valve 23, while the parking mechanism is released through solenoid valve 12 and valves 6 and 17. If the electrical pressure control valve 16 is now switched, clutch B is pressurized through valve 25 and closes. At the same time, switching logic 9 pressurizes and closes clutch D. If the electronic transmission control 32 fails while reverse gear is engaged, all solenoid valves are de-energized and solenoid valves 11 and 12 cut off the pressure supply to valves 24 and 25 and valve 17 so that the parking mechanism is engaged again by spring 19.

If the electronic transmission control fails in this state and the solenoid valves can no longer be energized, it must be ensured that the parking mechanism can be disengaged and an emergency gear for forward travel is engaged automatically. For this purpose, the parking latch is pulled out of the parking wheel manually by a lever 36 on a shaft by the driver, and lever 36 is latched. As a result, plunger 20 of valve 17 is moved to its lower position. Pressure oil passes through a groove 37 in plunger 20 from line 4 into line 31, supplying valves 24 and 25 with pressure oil though valve 23. Since lines 34 and 35 are connected with each other by emergency travel valve 26, valve 24 is switched such that clutch A is pressurized and closes. At the same time, valve 38 is switched and valve 7 is switched by switching valve 21, so that valve 23 is pressurized on both sides. By valve 28, valve 6 is switched such that surface 18 of valve 17 is pressurized additionally. If lever 36 has not been latched, the parking mechanism remains disengaged until the engine of the automobile is switched off, which returns plunger 20 of valve 17 to its upper initial position. If lever 36 has been latched, the parking mechanism remains disengaged until lever 36 is returned to its initial position.

In another design, a start-up interlock 39 is attached to lever 36 for safety reasons, so that the engine cannot be started when the parking mechanism is disengaged.

This provision ensures that, in case of failure of the electronic transmission control 32 and thus de-energized solenoid valves, the parking mechanism can always be disengaged by manually operating a lever 36, while the engine is running, and a forward gear is selected so that the vehicle can move forward.

Reference Numbers 1 solenoid valve logic
2 clutch logic
3 pump
4 line
5 system pressure valve
6 valve
7 reversing valve
8 pressure reduction valve
9 switching logic
10 line
11 solenoid valve
12 solenoid valve
14 line
15 electrical pressure control valve
16 electrical pressure control valve
17 valve (parking mechanism valve)
18 surface
19 spring
20 plunger
21 valve
22 line
23 valve
24 clutch valve
25 clutch valve
26 emergency travel valve
27 line
28 valve
29 line
30 line
32 transmission control
33 solenoid
34 line
35 line
36 lever
37 groove
38 valve
39 start-up interlock safety device

What is claimed is:

1. An electronic hydraulic control device of an automatic automobile transmission with frictional clutches or brakes (A, B, C, D, E) that can be hydraulically engaged and released to shift individual gears, whose actuators have clutch valves (24, 25) associated with them, with an electronic control device (32) by which a plurality of electrically actuated solenoid valves (11, 12, 15, 16) controlling the actuators can be adjusted depending on operating parameters of the automobile transmission and of a drive motor as well as of a selector lever device, and with a parking mechanism connected with a spring(19) which disengages hydraulically through the control device or manually and which can be locked by the spring(19), wherein by manually unlocking the parking mechanism a parking mechanism valve (17) is hydraulically actuated thereby selecting and engaging a forward gear, wherein the parking mechanism valve (17) is connected to a manual unlocking device (36) and is held in a zero pressure state by the spring (19) so that pressure applied to the parking mechanism valve (17) is not passed on to a hydraulic drive control.

2. The electronic-hydraulic control device according to claim 1, characterized by the feature that by manually unlocking the parking mechanism, the parking mechanism valve (17) is hydraulically actuated thereby selecting the forward gear, and that by manually unlocking the parking mechanism, a plunger (20) of the parking mechanism valve (17) connected to the parking mechanism is actuated so that pressure applied to the parking mechanism valve (17) is passed on to the hydraulic drive control thereby maintaining the plunger (20) of the parking mechanism valve (17) in this position by application of pressure until a pressure supply is shut off.

3. The electronic-hydraulic control device according to claim 1, characterized by the feature that in case of a failure of the electronic control device (32), while a reverse gear is selected, a brake or clutch (B, D) required for reverse travel of said frictional clutches or brakes is opened by depressurizing its corresponding control valve (25, 9) while the parking mechanism is locked automatically by the spring.

4. The electronic-hydraulic control device according to claim 1, characterized by the feature that the parking mechanism is unlocked by pressurization and a latch is engaged by energizing a solenoid which holds the parking mechanism in a disengaged position while it is energized.

5. The electronic-hydraulic control device according to claim 1, characterized by the feature that by pressurizing a clutch or brake for forward travel (A) of said frictional clutches or brakes followed by de-energizing all solenoid valves (11, 12, 15, 16) a valve controlling the parking mechanism valve (17) is actuated until the drive motor stops so that the parking mechanism remains disengaged.

6. The electronic-hydrauliclcontrol device according to claim 1, characterized by the feature that when the parking mechanism is manually disengaged, a safety device prevents the drive motor from starting.

7. The electronic-hydraulic control device according to claim 1, characterized by the feature that a safety device prevents the drive motor from being started when the parking mechanism has been disengaged manually.

* * * * *